(12) United States Patent
Ankaiah et al.

(10) Patent No.: US 8,913,487 B2
(45) Date of Patent: Dec. 16, 2014

(54) FAST FAILOVER OF ACCESS POINTS IN A SPLIT-PLANE DEPLOYMENT

(75) Inventors: Shashi Hosakere Ankaiah, Bangalore (IN); Vivek L Atreya, Bangalore (IN); Seemant Choudhary, Fremont, CA (US); Udaya Shankar, Bangalore (IN)

(73) Assignee: Avaya Inc., Basking Ridge, NJ (US)

( * ) Notice: Subject to any disclaimer, the term of this patent is extended or adjusted under 35 U.S.C. 154(b) by 149 days.

(21) Appl. No.: 13/533,943

(22) Filed: Jun. 26, 2012

(65) Prior Publication Data

US 2013/0343178 A1 Dec. 26, 2013

(51) Int. Cl.
*G01R 31/08* (2006.01)

(52) U.S. Cl.
USPC ........................................................ 370/221

(58) Field of Classification Search
CPC .............. H04L 45/28; H04L 41/0654; H04L 2012/5627; H04L 41/0668; H04L 45/00; H04L 47/10; H04L 47/30; H04L 47/11; H04L 12/437; H04L 12/433; H04J 2203/006; H04J 3/14
USPC .............. 370/216, 218, 221, 310, 310.2, 328, 370/338, 465
See application file for complete search history.

(56) References Cited

U.S. PATENT DOCUMENTS

| | | | |
|---|---|---|---|
| 8,446,818 B2* | 5/2013 | Moisiadis et al. | 370/218 |
| 2007/0264971 A1* | 11/2007 | Blankenship et al. | 455/406 |
| 2011/0032816 A1* | 2/2011 | Isaksson et al. | 370/225 |
| 2013/0176859 A1* | 7/2013 | Stanislaus et al. | 370/242 |

* cited by examiner

*Primary Examiner* — Anh Ngoc Nguyen

(57) ABSTRACT

A method, system and computer readable medium for fast failover of an access point are described. A system can cause a failover of a first wireless access point when a wireless control point determines that a first wireless switching plane has failed through a platform link failure mechanism. The system can also prevent a failover of the first wireless access point or a second wireless access point when a message is received from both the first wireless switching plane and a second wireless switching plane indicating that the other wireless switching plane has failed.

18 Claims, 5 Drawing Sheets

FAST FAILOVER OF ACCESS POINTS IN A SPLIT-PLANE DEPLOYMENT

TECHNICAL FIELD

Embodiments relate generally to wireless networking, and more particularly, to methods, systems and computer readable media for fast failover of access points in split-plane wireless network deployments.

BACKGROUND

Wireless network deployments models include the overlay deployment model and the split-plane deployment model. An overlay deployment model is one wireless network deployment model that may be commonly used. An overlay deployment model can include collocation of wireless control plane (WCP) functions and wireless switching plane (WSP) functions in a single device (e.g., a wireless controller or WC). A split-plane deployment model can include WCP functions decoupled from WSP functions, with each of the WCP and WSP located in a separate device.

Forwarding in a wireless deployment can include distributed forwarding and centralized forwarding. Distributed forwarding can include a special case of a split-plane deployment model in which some or all of the WSP functionality resides in an access point (AP).

Centralized forwarding can include a deployment in which WSP functionality resides outside of the APs. APs forward traffic to a device that implements the WSP functionality. The overlay deployment model and split-plane deployment model are examples of centralized forwarding.

SUMMARY

One embodiment includes a wireless network system. The system can have a wireless control point, a first wireless switching plane, a second wireless switching plane, a first wireless access point and a second wireless access point.

The wireless control point is adapted to cause a failover of the second wireless access point when the wireless control point determines that the first wireless switching plane has failed. The wireless control point is also adapted to not cause a failover of the first wireless access point or the second wireless access point when a message is received from both the first wireless switching plane and the second wireless switching plane indicating that the other wireless switching plane has failed.

An interswitch trunk line can couple the first wireless switching plane with the second wireless switching plane. The first wireless switching plane and the second wireless switching plane can communicate over the interswitch trunk line via a split multi-line trunking protocol. The second wireless switching plane can determine that the first wireless switching plane has failed based on an interswitch trunk protocol.

The first wireless switching plane and the second wireless switching plane can communicate over the interswitch trunk line via a non-split multi-line trunking protocol. The second wireless switching plane can determine that the first wireless switching plane has failed based on a link down event.

Another embodiment is a method for fast failover of access points in a split-plane wireless network deployment. The method can include causing a failover of a first wireless access point when a wireless control point determines that a first wireless switching plane has failed through a platform link failure mechanism. The method can also include preventing a failover of the first wireless access point or a second wireless access point when a message is received from both the first wireless switching plane and a second wireless switching plane indicating that the other wireless switching plane has failed.

The first wireless switching plane and the second wireless switching plane can communicate over an interswitch trunk line. The method can include communicating from the first wireless switching plane to the second wireless switching plane over the interswitch trunk line via a split multi-line trunking protocol.

The method can include determining at the second wireless switching plane, that the first wireless switching plane has failed based on an interswitch trunk protocol. The method can also include communicating between the first wireless switching plane and the second wireless switching plane over the interswitch trunk line via a non-split multi-line trunking protocol. The method can further include determining, at the second wireless switching plane, that the first wireless switching plane has failed based on a link down event.

Yet another embodiment includes a nontransitory computer readable medium having stored thereon software instructions that, when executed by a processor, cause the processor to perform a series of operations comprising:

The processor can cause a failover of a first wireless access point when a wireless control point determines that a first wireless switching plane has failed through a platform link failure mechanism. Also, the system can prevent a failover of the first wireless access point or a second wireless access point when a message is received from both the first wireless switching plane and a second wireless switching plane indicating that each of the other respective wireless switching planes has failed.

The first wireless switching plane and the second wireless switching plane can communicate over an interswitch trunk line. The operations can also include communicating from the first wireless switching plane to the second wireless switching plane over the interswitch trunk line via a split multi-line trunking protocol.

The operations can further include determining, at the second wireless switching plane, that the first wireless switching plane has failed based on an interswitch trunk protocol. The operations can also include communicating between the first wireless switching plane and the second wireless switching plane over the interswitch trunk line via a non-split multi-line trunking protocol. The operations can also include determining, at the second wireless switching plane, that the first wireless switching plane has failed based on a link down event.

DETAILED DESCRIPTION

In general, an embodiment can include a method, system or computer readable medium for fast failover of access points in split-plane wireless network deployments. WSPs can be coupled via a split multi-link trunking (SMLT) or a non-SMLT protocol.

Figure 1:
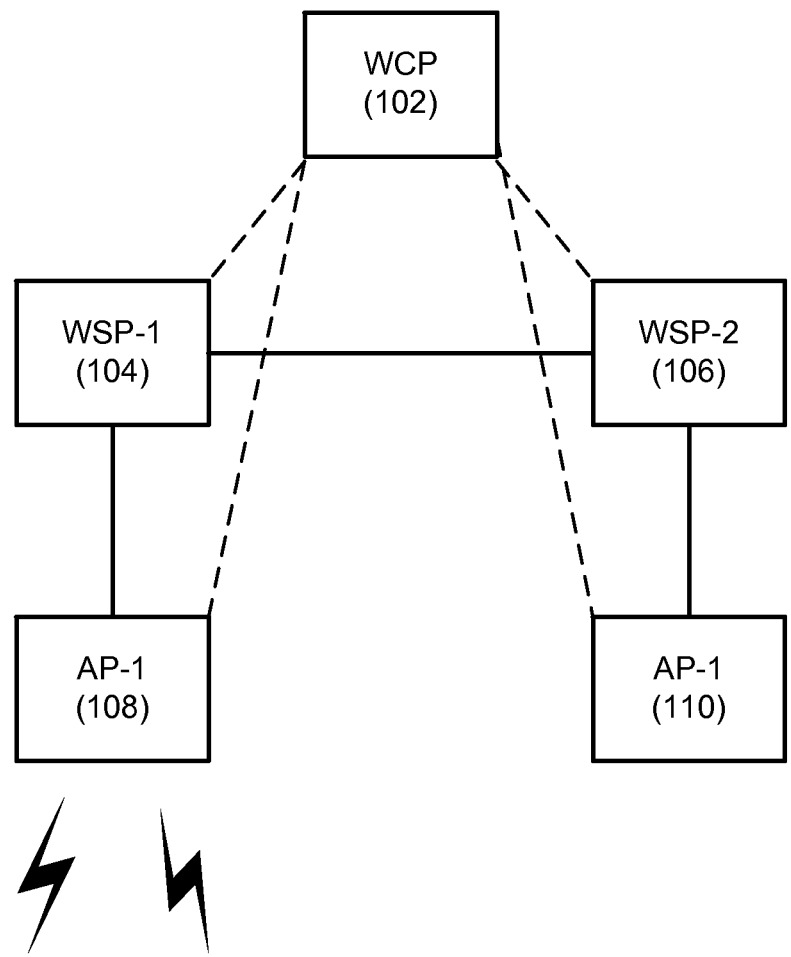
FIG. 1 is a diagram of an example wireless network with a split plane deployment in accordance with at least one embodiment.

As shown in FIG. 1, a wireless network 100 includes a wireless control point (WCP) 102, a first WSP 104, a second WSP 106, a first access point (AP-1) 108, a second access point (AP-2) 110, a first client device 112 and a second client device 114.

The WCP 102 can have a control channel connection (shown as dashed lines) to WSP-1 (104), WSP-2 (106), AP-1 (108) and AP-2 (110). WSP-1 (104) and WSP-2 (106) can be connected via a link such as an interswitch trunk (IST). The WSPs (104 and 106) can include an L2/L3 switch. The L2/L3 switches of the WSPs (104 and 106) can be partially managed by the WCP 102.

The access points (AP-1 and AP-2) can be devices managed by the WCP 102 and may not provide standard management interfaces (e.g., console, telnet/SSH, SNMP, HTTP or the like) for device configuration. Access points discover the WCP using a discovery protocol and establish a control channel with the WCP.

Configuration information for each access point can be defined on the WCP 102 and pushed to the access point when it associates with the WCP over the control channel. A WCP managed device, such as an access point, applies the received configuration from WCP with which it has associated. Also, access points report monitoring information to the WCP with which it has associated.

The WSPs (WSP-1 and WSP-2) are partially managed by the WCP 102. Each WSP discovers the WCP and establishes a control channel with the WCP. WSPs receive mobility VLAN configuration and state information from the managing WCP. An example of a WSP is the Avaya ERS 8800. If two WSPs are directly connected over IST, the WSPs can be configured to operate as SMLT pairs.

The WSPs (WSP-1 and WSP-2) can use an SMLT or non-SMLT protocol for the connection between the two WSPs. SMLT is an extension of MLT that allows edge switches to dual-home to two SMLT aggregation switches. SMLT can provide link failure protection and flexible bandwidth scaling.

SMLT can help avoid loops by allowing two edge aggregation switches to appear as a single device to the edge switches, which are dual homed to aggregation switches. Further, SMLT networks may not require the use of spanning tree protocols. The WSPs can be interconnected using an IST, which allows them to exchange address and state information thereby permitting rapid fault detection and forwarding path modification.

In a conventional deployment and configuration, the WSPs may be connected over an IST trunk and configured to operate as SMLT peers. The WSPs can discover a WCP and establish a control channel. The APs can also discover the WCP and establish a control channel.

The WCP may direct a first WSP to reserve resources for a first AP, and a second WSP to reserve resources for a second AP. The WCP can direct the first AP to terminate an access tunnel on the first WSP and the second AP to terminate an access tunnel on the second WSP. Assume that client devices associate with the first AP. The first AP and the first WSP program the access tunnel in a client VLAN and clients can send and receive traffic.

Assume, for this example of a conventional deployment, that the first WSP fails and the first AP detects the failure through a keep alive timeout signal or message. The first AP will then make a request to the WCP for a WSP. The WCP may assign the second WSP and direct the second WSP to reserve resources for the first AP. The WCP may then direct the first AP to terminate an access tunnel on the second WSP.

The first AP can establish a tunnel with the second WSP. The first AP then reprograms the access tunnel which is now terminated on the second WSP on all client VLANs. A problem with the above conventional approach is that the failover may take tens of seconds, during which time customer data may be affected.

One solution proposed to the conventional AP failover scenario described above is an SMLT assisted failover, which can failover in a subsecond timeframe. However, the SMLT assisted failover is vulnerable to an intermittent (e.g., flapping) trunk connection. The failover sequence may be repeated as the trunk flaps.

An embodiment can provide a fast failover for access points in a split-plane deployment and a robust mechanism that is tolerant of flapping trunk lines.

Figure 2:
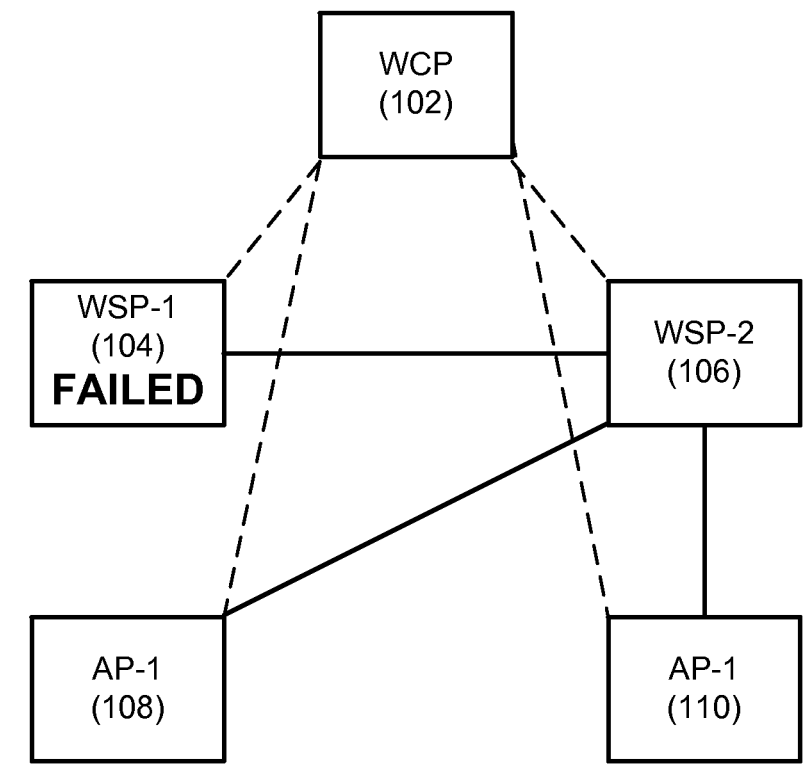
FIG. 2 shows the wireless network of FIG. 1, in which a WSP has failed.
Figure 4:
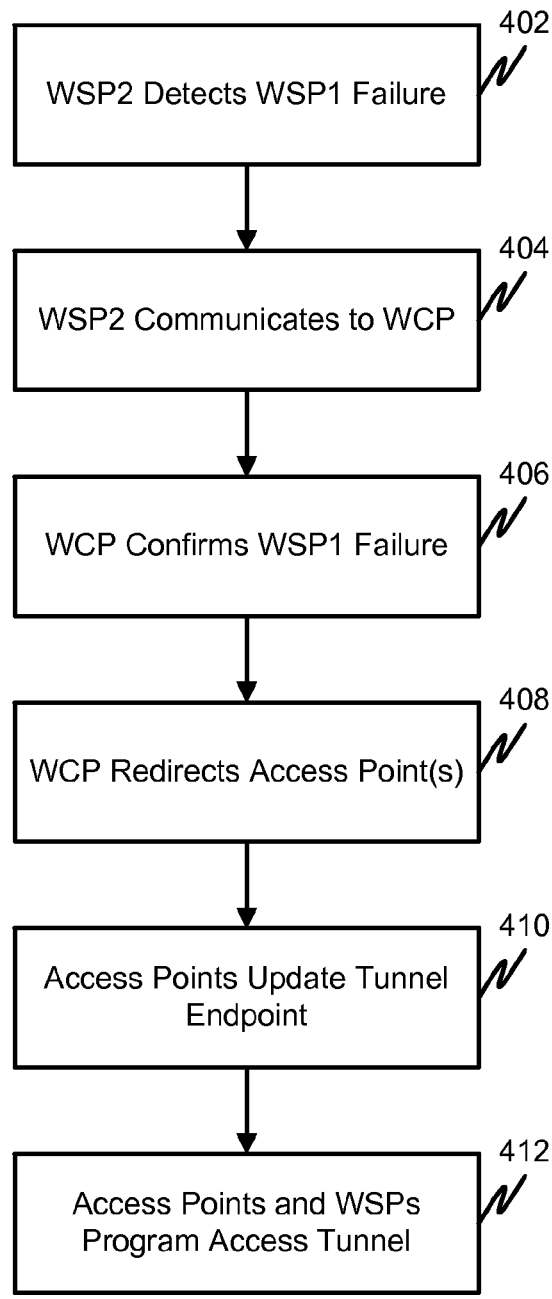
FIG. 4 is a flow chart showing an example failover method in accordance with at least one embodiment.

FIG. 2 shows a wireless network deployment in which WSP-1 104 has failed. The flowchart shown in FIG. 4 is an example method for AP failover when a WSP fails and can be understood with reference to FIG. 2.

Processing begins at 402, where WSP-2 106 detects a failure of WSP-1 104 through a platform link failure mechanism. In an SMLT implementation, an IST protocol could be used by WSP-2 106 to determine that WSP-1 104 has failed. In a non-SMLT implementation, a link down event could be used by WSP-2 106 to determine that WSP-1 104 had failed.

At 404, WSP-2 106 communicates the failure of WSP-1 104 to the WCP 102.

At 406, the WCP 102 confirms the failure of WSP-1 104, for example by attempting to communicate with WSP-1 104 and receiving no response. Also, another technique for confirming failure can include the WCP 102 waiting for a delta time (e.g., a configurable time in milliseconds) to hear from the WSP-1 104 for the link failure events (with WSP2 106). If the WCP 102 does not receive within the timeout, the WCP concludes that the WSP-1 104 is down, and proceeds to inform the APs to failover to WSP-2 106.

At 408, the WCP 102 directs AP-1 108 to terminate an access tunnel on WSP-2 106.

At 410, AP-1 108 updates the access tunnel endpoint to point to WSP-2 106 and terminates the tunnel on WSP-2 106.

At 412, AP-1 108 and WSP-2 106 program the access tunnel on all client VLANs.

The above steps (e.g., 402-412) can be performed in a subsecond time frame. It will be appreciated that steps 402-412 can be repeated in whole or in part in order to perform a contemplated access point failover task.

Figure 3:
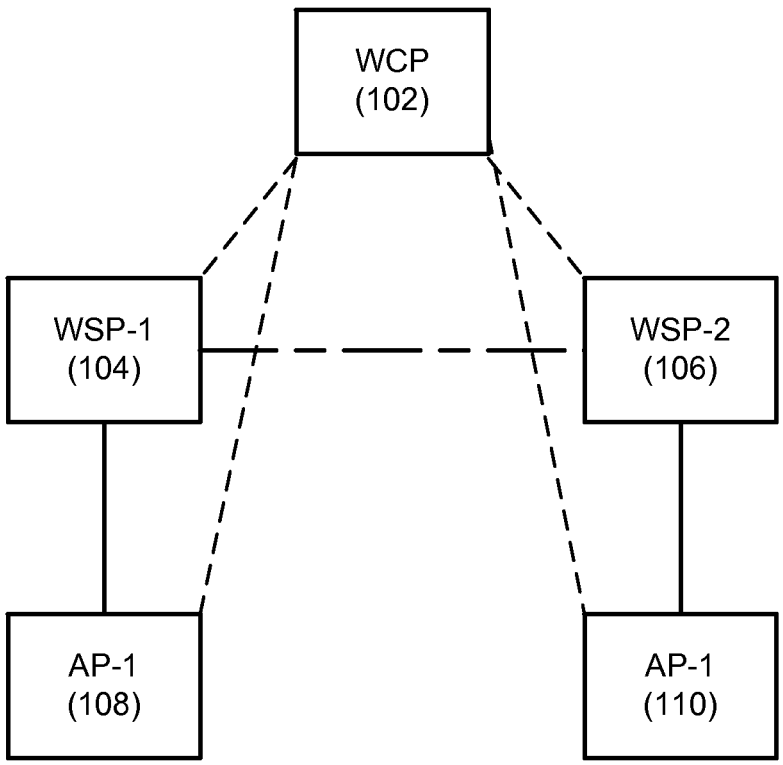
FIG. 3 shows the wireless network of FIG. 1, in which a trunk line between WSPs is intermittently down (e.g., flapping).
Figure 5:
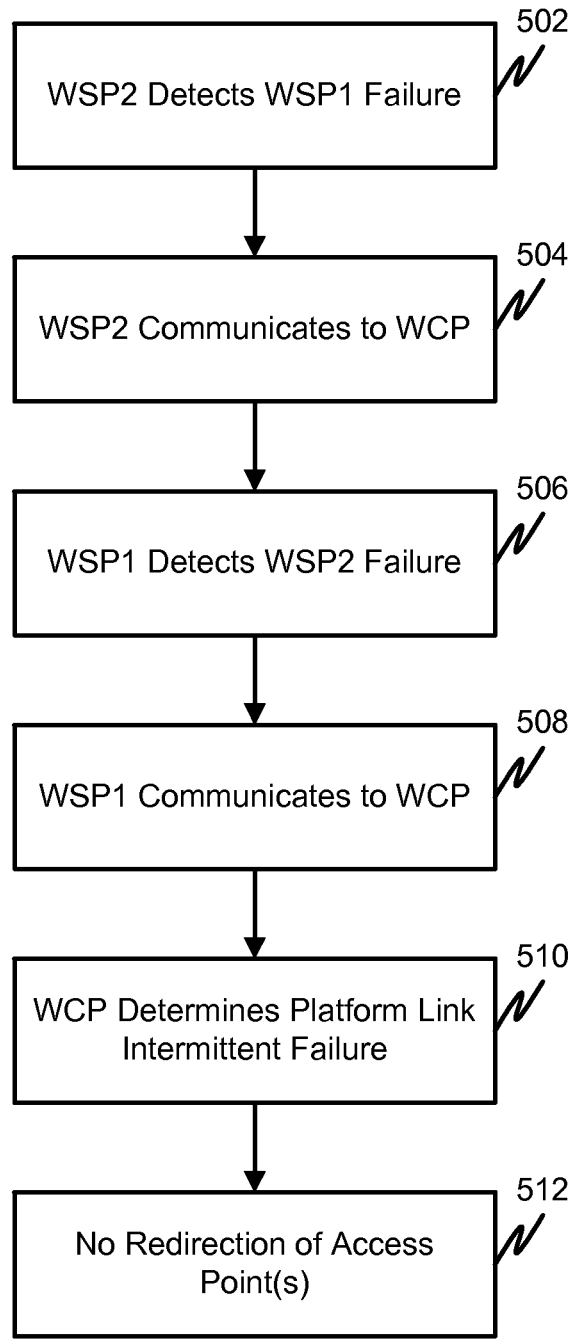
FIG. 5 is a flow chart showing an example method for detecting an intermittent line between WSPs in accordance with at least one embodiment.

FIG. 3 shows a scenario in which the inter switch trunk line between WSP-1 104 and WSP-2 106 flaps. FIG. 5 is a flowchart showing an example method of handling a flapping trunk line.

Processing begins at 502, where WSP-2 106 detects what appears to be a failure of WSP-1 104 through a platform link failure mechanism in a manner similar to that described above for 402. However, in the case of FIGS. 3 and 5, WSP-1 104 has not failed, but rather the trunk line between WSP-1 and WSP-2 is flapping.

At 504, WSP-2 106 communicates the detection of a possible failure of WSP-1 104 to the WCP 102.

At 506, around the same time as 502 and 504, WSP-1 104 detects appears to be a failure of WSP-2 106 through a platform link failure mechanism in a manner similar to that described above for 402. However, in the case of FIGS. 3 and 5, WSP-2 106 has not failed, but rather the trunk line between WSP-1 and WSP-2 is flapping.

At 508, WSP-1 104 communicates the possible failure of WSP-2 106 to the WCP 102.

At 510, the WCP 102 determines that the trunk line is flapping because WSP-1 104 and WSP-2 106 each reported the other having failed. Because the WCP 102 receives reports from both WSPs, it is possible for the WCP 102 to determine that both WSPs are in fact functioning and that it is the trunk line between the two that has failed or become intermittent. Thus, the WCP 102 can determine that no failover and redirection of access points is needed (512).

The above steps (e.g., 502-512) can be performed in a subsecond time frame. It will be appreciated that steps 502-512 can be repeated in whole or in part in order to perform a contemplated access point failover task.

It will be appreciated that the modules, processes, systems, and sections described above can be implemented in hardware, hardware programmed by software, software instructions stored on a nontransitory computer readable medium or a combination of the above. A system for edge network virtualization encapsulation, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, systems, methods and computer readable media for fast failover of access points in split-plane wireless network deployments.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A wireless network system comprising:
a wireless control point;
a first wireless switching plane;
a second wireless switching plane;
a first wireless access point; and
a second wireless access point,
wherein the wireless control point is configured to cause a failover of the second wireless access point when the wireless control point determines that the first wireless switching plane has failed, and
wherein the wireless control point is configured to not cause the failover of the first wireless access point or the second wireless access point when a message is received from both the first wireless switching plane and the second wireless switching plane indicating that the other wireless switching plane has failed.

2. The system of claim 1, further comprising an interswitch trunk line coupling the first wireless switching plane with the second wireless switching plane.

3. The system of claim 2, wherein the first wireless switching plane and the second wireless switching plane communicate over the interswitch trunk line via a split multi-line trunking protocol.

4. The system of claim 3, wherein the second wireless switching plane determines the first wireless switching plane has failed based on an interswitch trunk protocol.

5. The system of claim 2, wherein the first wireless switching plane and the second wireless switching plane communicate over the interswitch trunk line via a non-split multi-line trunking protocol.

6. The system of claim 5, wherein the second wireless switching plane determines the first wireless switching plane has failed based on a link down event.

7. A method for fast failover of access points in a split-plane wireless network deployment, the method comprising:
 causing a failover of a first wireless access point when a wireless control point determines that a first wireless switching plane has failed through a platform link failure mechanism; and
 preventing a failover of the first wireless access point or a second wireless access point when a message is received from both the first wireless switching plane and a second wireless switching plane indicating that the other wireless switching plane has failed.

8. The method of claim 7, wherein the first wireless switching plane and the second wireless switching plane communicate over an interswitch trunk line.

9. The method of claim 8, further comprising communicating from the first wireless switching plane to the second wireless switching plane over the interswitch trunk line via a split multi-line trunking protocol.

10. The method of claim 9, further comprising determining, at the second wireless switching plane, that the first wireless switching plane has failed based on an interswitch trunk protocol.

11. The method of claim 8, further comprising communicating between the first wireless switching plane and the second wireless switching plane over the interswitch trunk line via a non-split multi-line trunking protocol.

12. The method of claim 11, further comprising determining, at the second wireless switching plane, that the first wireless switching plane has failed based on a link down event.

13. A nontransitory computer readable medium having stored thereon software instructions that, when executed by a processor, cause the processor to perform a series of operations comprising:
 causing a failover of a first wireless access point when a wireless control point determines that a first wireless switching plane has failed through a platform link failure mechanism; and
 preventing a failover of the first wireless access point or a second wireless access point when a message is received from both the first wireless switching plane and a second wireless switching plane indicating that the other wireless switching plane has failed.

14. The nontransitory computer readable medium of claim 13, wherein the first wireless switching plane and the second wireless switching plane communicate over an interswitch trunk line.

15. The nontransitory computer readable medium of claim 14, wherein the operations further comprise communicating from the first wireless switching plane to the second wireless switching plane over the interswitch trunk line via a split multi-line trunking protocol.

16. The nontransitory computer readable medium of claim 15, further comprising determining, at the second wireless switching plane, that the first wireless switching plane has failed based on an interswitch trunk protocol.

17. The nontransitory computer readable medium of claim 14, further comprising communicating between the first wireless switching plane and the second wireless switching plane over the interswitch trunk line via a non-split multi-line trunking protocol.

18. The nontransitory computer readable medium of claim 17, further comprising determining, at the second wireless switching plane, that the first wireless switching plane has failed based on a link down event.

* * * * *